US012000746B2

(12) United States Patent
Leger et al.

(10) Patent No.: US 12,000,746 B2
(45) Date of Patent: Jun. 4, 2024

(54) WINDSHIELD SENSING DEVICE (71) Applicant: MEAS FRANCE, Toulouse (FR)

(72) Inventors: Vincent Leger, Toulouse (FR); Yannick Vidal, Toulouse (FR)

(73) Assignee: MEAS France, Toulouse (FR)

( * ) Notice: Subject to any disclaimer, the term of this patent is extended or adjusted under 35 U.S.C. 154(b) by 407 days.

(21) Appl. No.: 17/212,602

(22) Filed: Mar. 25, 2021

(65) Prior Publication Data
US 2021/0208015 A1 Jul. 8, 2021

Related U.S. Application Data (63) Continuation of application No. PCT/EP2019/075767, filed on Sep. 24, 2019.

(30) Foreign Application Priority Data

Sep. 25, 2018 (EP) ..................... 18306250

(51) Int. Cl.
G01L 5/00 (2006.01)
B60R 11/00 (2006.01)
B60R 11/04 (2006.01)
B60S 1/08 (2006.01)

(52) U.S. Cl.
CPC ............ *G01L 5/0038* (2013.01); *B60R 11/04* (2013.01); *B60R 2011/0026* (2013.01); *B60S 1/0881* (2013.01)

(58) Field of Classification Search
CPC ................... G01L 5/0038; B60R 11/04; B60R 2011/0026; B60S 1/0881
See application file for complete search history.

(56) References Cited

U.S. PATENT DOCUMENTS

| 7,770,433 | B2* | 8/2010 | Rothacher | .......... | B60H 1/00785 |
| | | | | | 73/1.45 |
| 7,900,464 | B2* | 3/2011 | Aoki | .................. | B60H 1/00785 |
| | | | | | 236/44 C |
| 8,448,914 | B2* | 5/2013 | Roehr | ................... | B60S 1/0881 |
| | | | | | 73/866.5 |
| 2003/0086475 | A1 | 5/2003 | Schmitt et al. | | |
| 2004/0232773 | A1 | 11/2004 | Parker et al. | | |
| 2008/0016945 | A1 | 1/2008 | Rothacher et al. | | |
| 2013/0207669 | A1 | 8/2013 | Shinoda et al. | | |
| 2018/0156670 | A1* | 6/2018 | Otsuka | ................... | G01K 1/143 |

(Continued)

FOREIGN PATENT DOCUMENTS

| DE | 102009011614 A1 * | 9/2010 | ............. B60R 11/02 |
| DE | 102012017942 A1 | 3/2014 | |
| EP | 1097848 A2 | 5/2001 | |

(Continued)

OTHER PUBLICATIONS

International Search Report, dated Oct. 15, 2019, 2 pages.

Primary Examiner — Octavia Davis Hollington
(74) Attorney, Agent, or Firm — Barley Snyder (57) ABSTRACT A sensing device for a windshield includes an attachment member attachable to a surface of the windshield and a sensing element having a transducer. The attachment member has a pressing device. The pressing device applies a pressure on or over the transducer when the attachment member is attached to the surface and presses the transducer against the surface.

16 Claims, 9 Drawing Sheets (56) References Cited

U.S. PATENT DOCUMENTS

2023/0016596 A1\* 1/2023 Durupt .................. G01K 1/143

FOREIGN PATENT DOCUMENTS

| EP | 2705986 A1 | | 3/2014 | |
|----|------------|---|--------|---|
| JP | 2003202311 A | | 7/2003 | |
| JP | 2016224037 A | \* | 12/2016 | ............... G01K 1/14 |
| JP | 2016075656 A | | 5/2018 | |
| KR | 20130102193 A | \* | 9/2013 | |
| KR | 101717577 B1 | \* | 3/2017 | |
| WO | 2006029901 A1 | | 3/2006 | |

\* cited by examiner

WINDSHIELD SENSING DEVICE

CROSS-REFERENCE TO RELATED APPLICATIONS

This application is a continuation of PCT International Application No. PCT/EP2019/075767, filed on Sep. 24, 2019, which claims priority under 35 U.S.C. § 119 to European Patent Application No. 18306250.4, filed on Sep. 25, 2018.

FIELD OF THE INVENTION

The present invention relates to a sensing device and, more particularly, to a windshield sensing device.

BACKGROUND

Temperature sensors, humidity sensors, optical sensors or a combination thereof are known to be used in windshield sensing devices for the purpose of automatically adapting the heating, ventilation, and air conditioning (so called HVAC) or for automatically switching on the wiper. As an example, a windshield temperature sensing device is commonly used for preventing fogging conditions. Windshield mounted temperature and/or humidity sensors can further be combined with light sensors or solar sensors. For allowing a precise and reliable monitoring of the temperature and/or the moisture, the sensor of the sensing device has to be kept in constant contact with the surface of the windshield surface during the whole lifetime of the vehicle, and thus withstand mechanical shock and vibration.

Figure 9A:
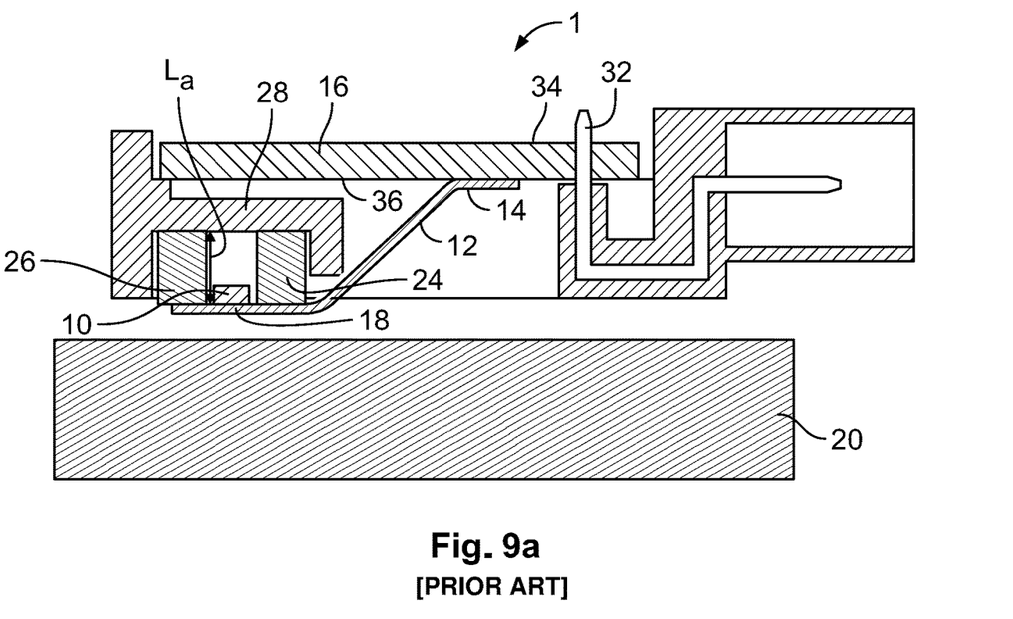
FIG. 9a is a sectional side view of a sensing device of the prior art not attached to a surface of a windshield.
Figure 9B:
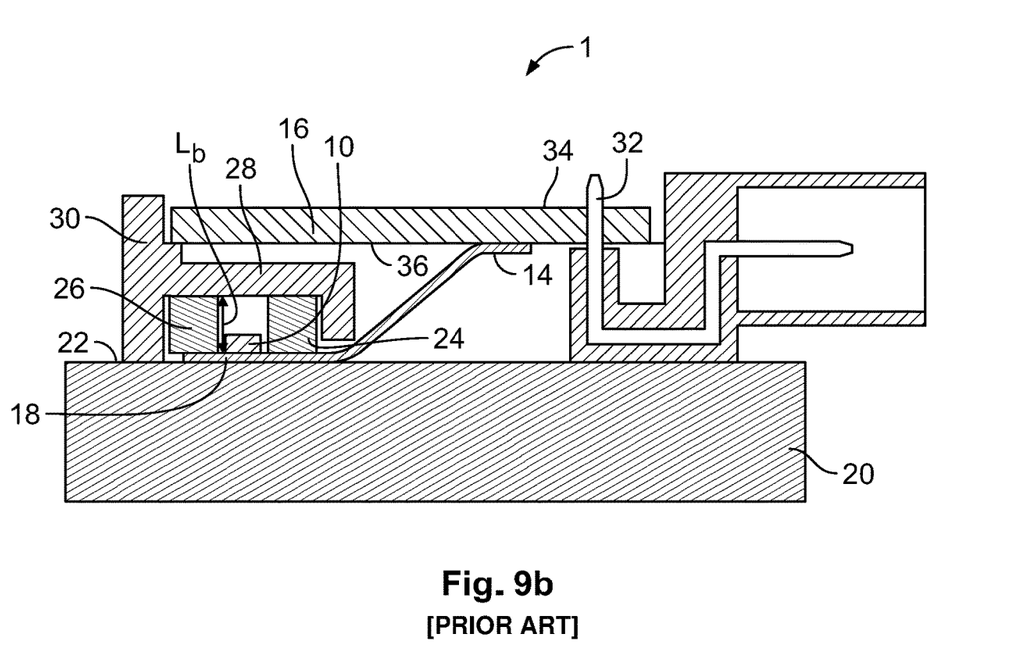
FIG. 9b is a sectional side view of the sensing device the prior art attached to the surface of the windshield.

A conventional temperature sensing device 1 is shown in FIGS. 9a and 9b. As illustrated by the cross-sectional view of FIG. 9a, a thermistor 10 can be soldered on a flexible polyimide film 12 such that one end 14 of the polyimide film 12 is then soldered to a printed circuit board (PCB) 16 and another end 18, on which the thermistor 10 is welded, is maintained on the windshield surface 20. The end 18 provided with the thermistor 10 is usually pressed against the windshield surface 22 by foam elements 24, 26, such as thermal foam, arranged on either side of the thermistor 10. Hence, as illustrated in FIG. 9b, when the device 1 is attached to the windshield surface 20, the foam elements 24, 26 are compressed such that their respective length Lb is smaller than their respective initial length La represented in FIG. 9a. These foam elements 24, 26 are positioned between the polyimide film 12 and a portion 28 of the housing 30 of the sensing device 1. Electrical pin contacts 32 of an associated connector extend out of the PCB 16 and are then welded to the PCB 16 on a surface 34 opposite to the surface 36 provided with the polyimide film 12.

The foam used for fixing the polyimide film with the thermistor on the windshield, however, is subject to aging, degradation and/or mechanical stress. Furthermore, the soldering of the thermistor on the polyimide film, the soldering of the sensing device to the PCB, and the soldering of the connector pin contact to the PCB complicate the soldering process by requiring successive steps.

SUMMARY

A sensing device for a windshield includes an attachment member attachable to a surface of the windshield and a sensing element having a transducer. The attachment member has a pressing device. The pressing device applies a pressure on or over the transducer when the attachment member is attached to the surface and presses the transducer against the surface.

BRIEF DESCRIPTION OF THE DRAWINGS

The invention will now be described by way of example with reference to the accompanying Figures, of which.

DETAILED DESCRIPTION OF THE EMBODIMENT(S)

The accompanying drawings are incorporated into the specification and form a part of the specification to illustrate several embodiments of the present invention. These drawings, together with the description, serve to explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Features and advantages will become apparent from the following more particular description of the various embodiments of the invention, as illustrated in the accompanying drawings, in which like references refer to like elements.

The present invention will now be described with reference to the attached Figures. Various structures, systems and devices are schematically depicted in the drawings for purposes of explanation only and so as to not obscure the present disclosure with details, which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein.

Figure 1A:
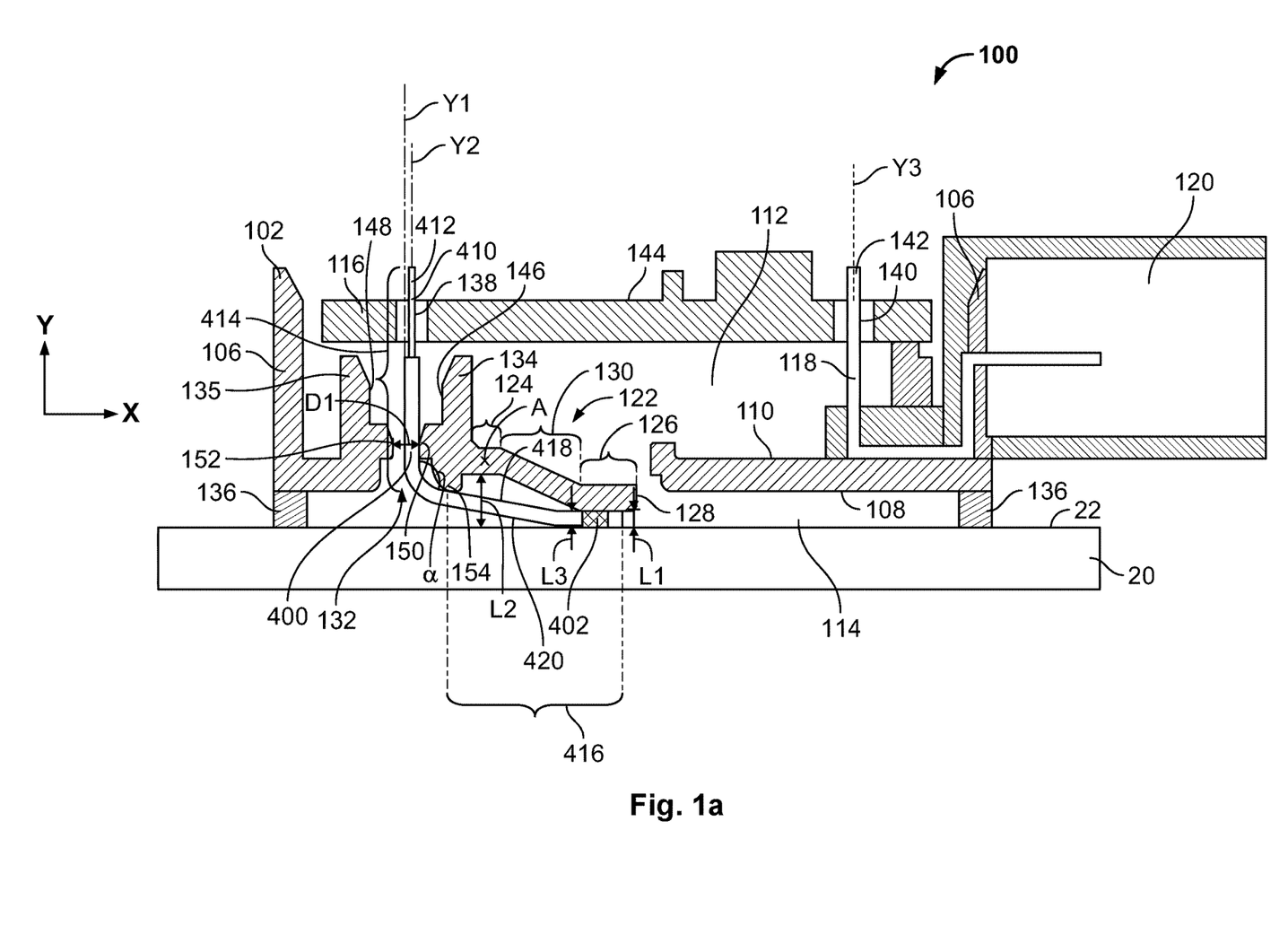
FIG. 1a is a sectional side view of a sensing device according to a first embodiment attached to a surface of a windshield.
Figure 1B:
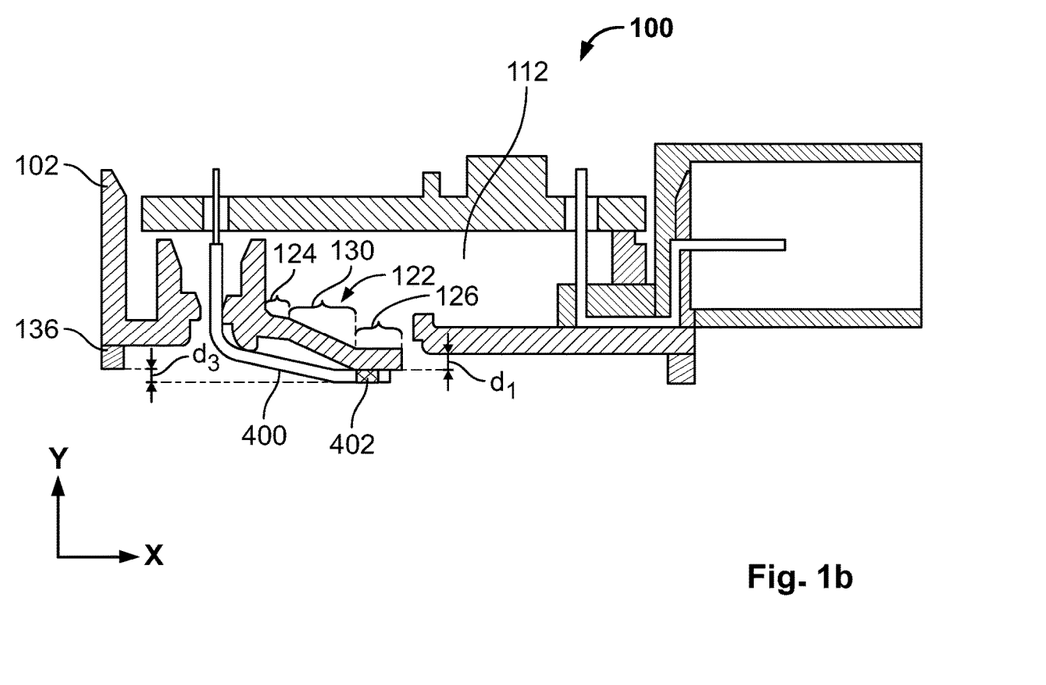
FIG. 1b is a sectional side view of the sensing device not attached to the surface.
Figure 1C:
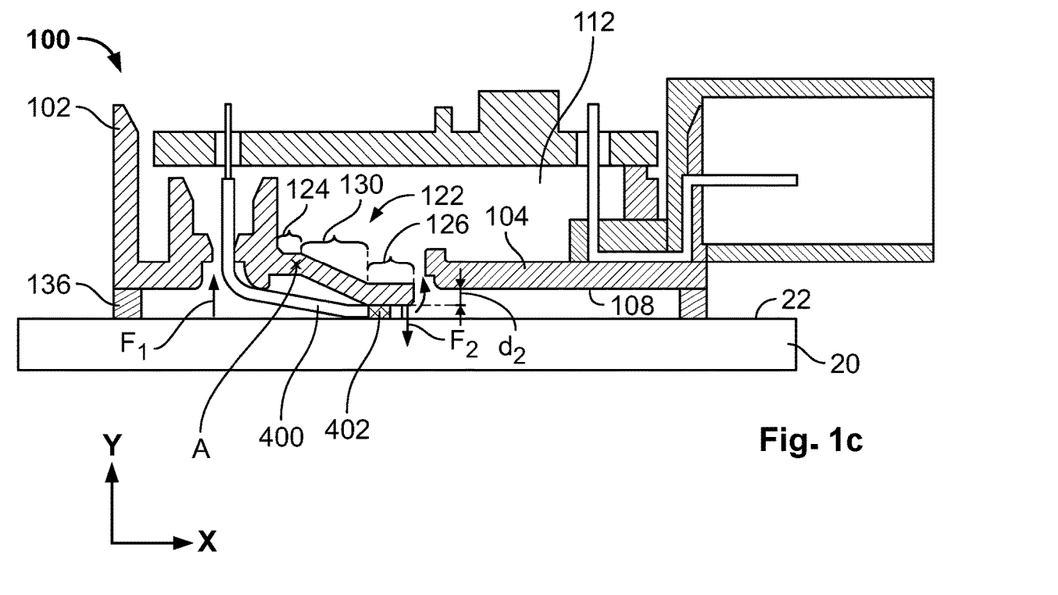
FIG. 1c is a sectional side view of the sensing device attached to the surface.

FIGS. 1a-1c show a cross-sectional view of a sensing device 100 according to a first embodiment of the present invention. The sensing device 100 is attached to a surface 22 of a windshield 20. The windshield 20 may be the windshield of a motor vehicle, for example. FIG. 1b illustrates a cross-sectional view of the sensing device 100 according to the first embodiment wherein the sensing device 100 is not attached to the surface 22. The FIG. 1b and the FIG. 1c allow comparing the attached state to the unattached state of sensing device 100.

The sensing device 100 has an attachment member 102 provided with a bottom surface 104 surrounded by sidewalls 106, as shown in FIGS. 1a-1c, such that the attachment member 102 is configured to be attached to the windshield 20 by an external bottom surface 108 opposite to an internal bottom surface 110 from which extend the sidewalls 106. The sidewalls 106 extending from the internal bottom surface 110 define an inside 112 of the attachment member 102. The external bottom surface 108 faces outside 114 the attachment member 102.

The inside 112 of the attachment member 102 serves as a housing for a sensing element 400 comprising a transducer 402, a printed circuit board (PCB) 116 and an electrical contact pin 118 of an associated connector 120, as shown in FIG. 1a. In a variant, the attachment member 102 may comprise more than one electrical contact pin 118.

The bottom surface 104 of the attachment member 102 has a pressing device 122, shown in FIGS. 1a-1c, being tab-shaped so that a first portion 124 of the pressing device 122 is attached to the attachment member 102, and a second portion 126 of the pressing device 122, opposite to the first portion 124, terminates in a free extremity 128. The first portion 124 and the second portion 126 are connected via a member 130. The manufacturing of the pressing device 122 can be simplified due to the tab shape.

As illustrated by the cross-sectional view of FIGS. 1a-1c, the first portion 124, the second portion 126 and the member 130 of the pressing device 122 are longitudinally misaligned so that when the sensing device 100 is attached to the windshield 20, the second portion 126 is closer to the windshield surface 22 than the first portion 124 according to a direction Y normal to the windshield surface 22. Hence, the distance L1 between the second portion 126 and the surface 22 is smaller than the distance L2 between the first portion 124 and the windshield surface 22 according to the direction Y.

The bottom surface 104 of the attachment member 102 has a through-hole 132 whose axis Y1 is normal to the surface 22 of the windshield 20, when the sensing device 100 is attached to the windshield 20 as illustrated in FIGS. 1a and 1c. The through-hole 132 is surrounded by two sidewalls 134, 135 extending from the internal bottom surface 110 towards the inside 112 of the attachment member 102 along a direction parallel to the direction Y. The first portion 124 of the pressing device 122 is connected to the sidewall 134 of the through-hole 132 at the bottom surface 104.

According to the first embodiment, the pressing device 122, made of the first portion 124, the second portion 126 and the member 130, the sidewalls 134 of the through-hole 132, the bottom surface 104 and the sidewalls 106 of the attachment member 102 are made of the same material, in particular in plastic material. The use of plastic material for the pressing device 122 provides a spring arm which stays resilient and is more stable over the years than foam elements, as used in the prior art and illustrated in FIGS. 9a-b. Furthermore, the pressing device 122 on the sensing device 100 is adapted to stay robust, even in environment subjected to vibration and shock, as for motor vehicle application.

In an embodiment, the pressing device 122, made of the first portion 124, the second portion 126 and the member 130, the sidewalls 134 of the through-hole 132, the bottom surface 104 and the sidewalls 106 of the attachment member 102 is integrally formed such that it is one-piece, in particular manufactured by injection molding. Hence, the pressing device 122 and the attachment member 102 can be realized in one single step, without using any fasteners or bonding process, thus reducing both the manufacturing time and the number of elements, i.e. reducing the cost manufacturing and simplifying the process.

The pressing device 122 is resilient and is able to pivot at the first portion 124 around an axis A perpendicular to the length of the tab 122 and can act as a spring arm for applying a pressure on or over the transducer 402 of the sensing element 400. As illustrated in FIGS. 1b and 1c, the resilience of the pressing device 122 allows pivoting the pressing device 222 around the axis A such that the distance d1, d2 between the external bottom surface 108 of the attachment 102 and the surface of second portion 126 in contact with the sensing element 400 is smaller in the attached state than in the non-attached state, i.e. d2<d1.

The attachment member 102 is attached to the surface 22 of the windshield 20 by mounting pads 136 positioned between the external bottom surface 108 of the attachment member 102 and the surface 22 of the windshield 20. Hence, the external bottom surface 108 of the attachment member 102 is facing the surface 22 of the windshield when the sensing device 100 is attached to the windshield 20, as shown in FIGS. 1a and 1c.

As it can be seen in FIG. 1b, the pressing device 122, in the non-attached state, applies a pressure on the sensing element 400 such that the transducer 402 is positioned lower than the mounting pads 136, as annotated by distance d3. In contrast thereto, when the sensing device 100 is attached to the windshield 20, as represented in FIG. 1c, the distance d3 is zero because the mounting pads 136 and the transducer 402 are aligned along the surface 22 of the windshield 20. The reduction of the distance d3 between the non-attached state and the attached state results from the rotation of the pressing device 222 around the axis A, the second portion 126 of the pressing device 122 being pushed towards the inside 112 of the attachment member 102 under the force F1 exerted by the windshield's surface 222. Hence, the pressing device 222 acts as a resilient spring arm.

When the sensing device 100 is attached to the windshield's surface 22, as represented in FIG. 1c, the second portion 126 of the pressing device 122 applies a force F2 towards to and normal to the surface 22 of the windshield 20. Consequently, the transducer 402 of the sensing element 400 is pressed over the windshield's surface 22.

The sensing element 400 will be further described by making reference to FIGS. 1a-1c and FIG. 2, FIG. 2 illustrating a top view of the sensing element 400 of FIG. 1.

Figure 2:
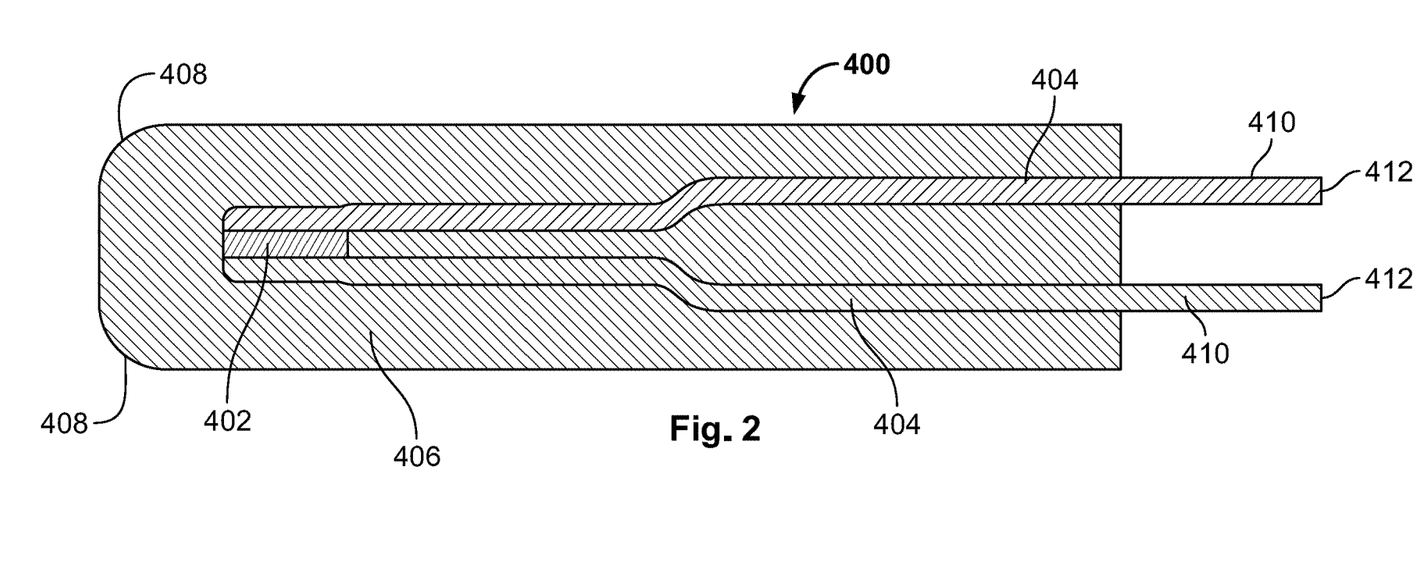
FIG. 2 is a sectional top view of a sensing element of the sensing device.

The sensing element 400 is made of two wires 404 both connected to the transducer 402. The two wires 404 extend out of the transducer 402 according to a same direction. The transducer 402 is adapted for detecting a physical quantity, such as temperature, and converting the data into an electrical signal. The transducer 402 and the wires 404 are embedded in a flexible film 406 such as a polyimide film. Thus, the sensing element 400 is able to be bent to an angle α without breaking.

In an embodiment, the sensing element 400 may be a Negative Temperature Coefficient (NTC) thermistor embedded in a flexible polyimide film. However, the present application is not limited to NTC thermistor, and, in a variant, the sensing element 400 may also be one of a temperature sensor, a humidity sensor, an optical sensor, a pressure sensor and a sound sensor, which comprises a transducer embedded in a flexible film.

The flexible film 406 has a substantially rectangular shape with rounded corners 408 at one side when viewed from above, as shown in FIG. 2. In the first embodiment, the flexible film 406 has a thickness L3 substantially equivalent to the thickness L4 of the transducer 402, the flexible film 406 being a thin film, and of the distance L1 between the second portion 126 of the pressing device 122 and the surface 22 of the windshield 20, when the sensing device 100 is attached to the windshield 20, as illustrated in FIG. 1. Actually, as it will be further explained, the thickness L3 of the sensing element 400 is substantially equivalent to the distance L1 for the purpose of avoiding the presence of any gap between the surface 22 and the sensing element 400 and thus, for enhancing the quality of the contact.

Each free extremity 410 of the wires 404, i.e. opposite to the ones connected to the transducer 402, extends out of the flexible film 406 so as to form respective bare wire end 412, as shown in FIG. 2. The bare wire ends 412 of the sensing element 400 are weldable, to a printed circuit board (PCB), for example.

Referring to the printed circuit board (PCB) 116 illustrated in FIG. 1a, the PCB 116 has a first through-hole 138 having an axis Y2 parallel to the direction Y, and dimensioned for receiving the bare wire end 412 of the sensing element 400. The PCB 116 has a second through-hole 140 having an axis Y3 parallel to the direction Y, and dimensioned for receiving a free extremity 142 of the electrical contact pin 118 of the associated connector 120.

Referring to the structural elements and features described above, a method for attaching the sensing device 100 on the windshield surface 22 will be further explained in the following with reference to FIGS. 1 and 2.

The electrical contact pin 118 of the associated connector 120 is fixed to the attachment member 102 so that the free extremity 142 of the electrical contact pin 118 extends towards the inside 112 of the attachment member 102 in a direction parallel to the sidewalls 106 of the attachment member 102, i.e. parallel to the direction Y.

The PCB 116 is accommodated in the housing 112 provided by the attachment member 102 such that the first through-hole 138 is aligned with the through-hole 132 of the attachment member 102, and the second through-hole 140 is aligned with the free extremity 142 of the electrical contact pin 118. Hence, the free extremity 142 of the electrical contact pin 118 can extend out of the second through-hole 140 from a surface 144 of the PCB 116, as shown in FIG. 1a.

The sensing element 400 made of the flexible film 406 is bent so that an angle α is formed between a first portion 414 comprising the bare wire end 412 and a second portion 416 comprising the transducer 402. The FIG. 1a being a cross-sectional view, only one of the two bare wire ends 412 represented in FIG. 2, is illustrated in FIG. 1a.

Bent like that, the first portion 414 of the sensing element 400 is inserted from the external bottom surface 108 inside the through-hole 132 of the attachment member 102 such that the bare wire end 412 also passes through the hole 138 of the PCB 116 and extends out of the surface 144 of the PCB 116, as shown in FIG. 1a. Hence, both of the bare wire 412 of the sensing element 400 and the free extremity 142 of the electrical contact pin 118 extend out from the same surface 144 of the PCB 116. Therefore, the operation of soldering or welding the bare wire 412 of the sensing element 400 and the operation of soldering or welding the free extremity 142 of the electrical contact pin 118 can be realized at the same step on the surface 144 of the PCB 116. Thus, in contrast with the process required for the conventional temperature sensing device 1 as shown in FIGS. 9a-b that needs a first step for welding the end 14 of the polyimide film 12 to the surface 36 of the PCB 16 and a second, distinct, step for welding the electrical contact pin 32 to the surface 34 of the PCB 16, the present invention allows simplifying the manufacturing of the sensing device 100 and reducing the manufacturing time as well.

The second portion 416 of the sensing element 400 is positioned so as to remain outside 114 the attachment member 102 and such that one surface 418 of the flexible film 406 surrounding the transducer 402 is in contact with the second portion 126 of the pressing 122. A surface 420 of the flexible film 406, opposite to the surface 418, is positioned and configured to be in contact with the windshield surface 22.

Further parts and housings, which are not represented in FIG. 1 but are shown in FIGS. 3, 4, 5, 6, 7 and 8, can be assembled and/or mounted to the attachment member 102. The sensing device 100 is then attached to the windshield surface 22 by the mounting pads 136. In a variant, the assembly steps described above may overlap, be skipped, or be carried out in another order.

In the position wherein the sensing device 100 is attached to the windshield surface 22, as illustrated in FIG. 1a, the pressing device 122, more precisely its second portion 126, applies a pressure on the surface 418 of the flexible film 406 over the transducer 402. This pressure allows keeping the transducer 402 of the sensing element 400 pressed against the windshield surface 22. It is because the transducer 402 is embedded in and protected by the flexible film 406 that it is possible to position the transducer 402 outside 114 the attachment 102 and to apply a pressure over the transducer 402 itself, instead of, as in the prior art, around the transducer 10 as illustrated in FIGS. 9a-b. Furthermore, in addition of protecting the transducer 402 from the environment, the flexible film 406 encapsulating the transducer 402 also allows improving the stability of the transducer 402.

The transducer 402 embedded in the flexible film 406 is then sandwiched between the pressing device 126 and the windshield surface 22 thanks to the surface contact between the surface 418 of the sensing element 400 and the pressing device 126, and the surface contact between the surface 420 of the sensing element 400 and the windshield surface 22. Hence, the pressure applied by the pressing device 122 of the attachment member 102 on the transducer 402 allows limiting the presence of air gap between the windshield surface 22 and the transducer 402, and thus enhances the efficiency of the sensing element 400.

According to the first embodiment, the sidewalls 134, 135 of the through-hole 132 of the attachment member 102 are provided on their inner surfaces 146, 148 with protrusions 150, 152 projecting from each inner surfaces 146, 148 towards the axis Y1 of the through-hole 132, as shown in FIG. 1a. Consequently, the protrusions 150, 152 form inside the through-hole 132 a narrower passage of diameter D1 than the remainder of the through-hole 132 delimited by the sidewalls 134, 135. The passage of diameter D1 is greater than the thickness L3 of the sensing element 400. Hence, the narrow passage of diameter D1 allows guiding and maintaining the first portion 414 of the sensing element 400 between the protrusions 150, 152, while leaving sufficient space for the sensing element 400 to move between the protrusions 150, 152 during vibration or shock events.

Furthermore, according to the first embodiment, the sidewall 134 of the through-hole 132, which is connected to the pressing device 122 at the bottom surface 104, terminates at the bottom surface 104 by a rounded portion 154 positioned so as to face the angle α of the sensing element 400, as shown in FIG. 1a. Hence, the rounded portion 154 allows accommodating the sensing element 400 in the attachment member 102 without damaging the flexible film 406 by ensuring that the flexible film 406 cannot be further bent to an angle smaller than the angle α, even during vibration or shock events. Therefore, the rounded portion 154, in addition to the protrusions 150, 152 of the through-hole 132 are structural elements that allow enhancing the stability and the reliability of the sensing element 400 of the sensing device 100.

Figure 3:
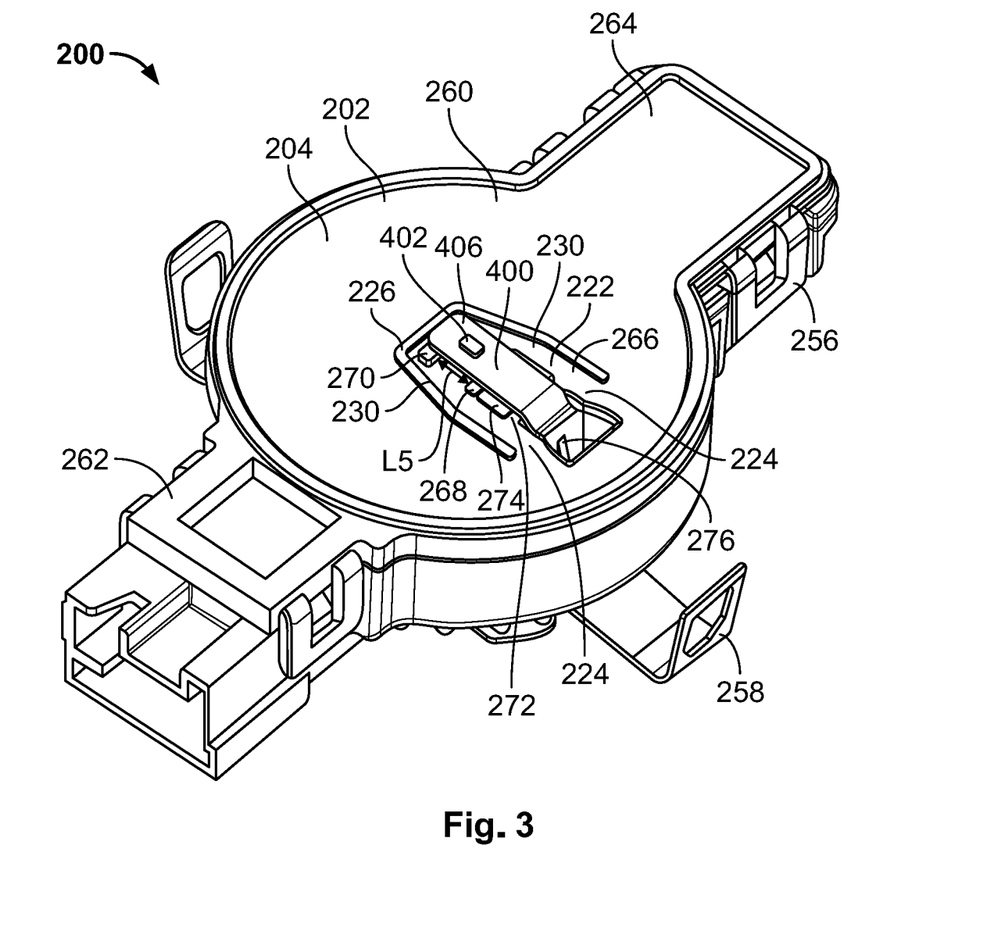
FIG. 3 is a perspective view of a sensing device according to a second embodiment.
Figure 4:
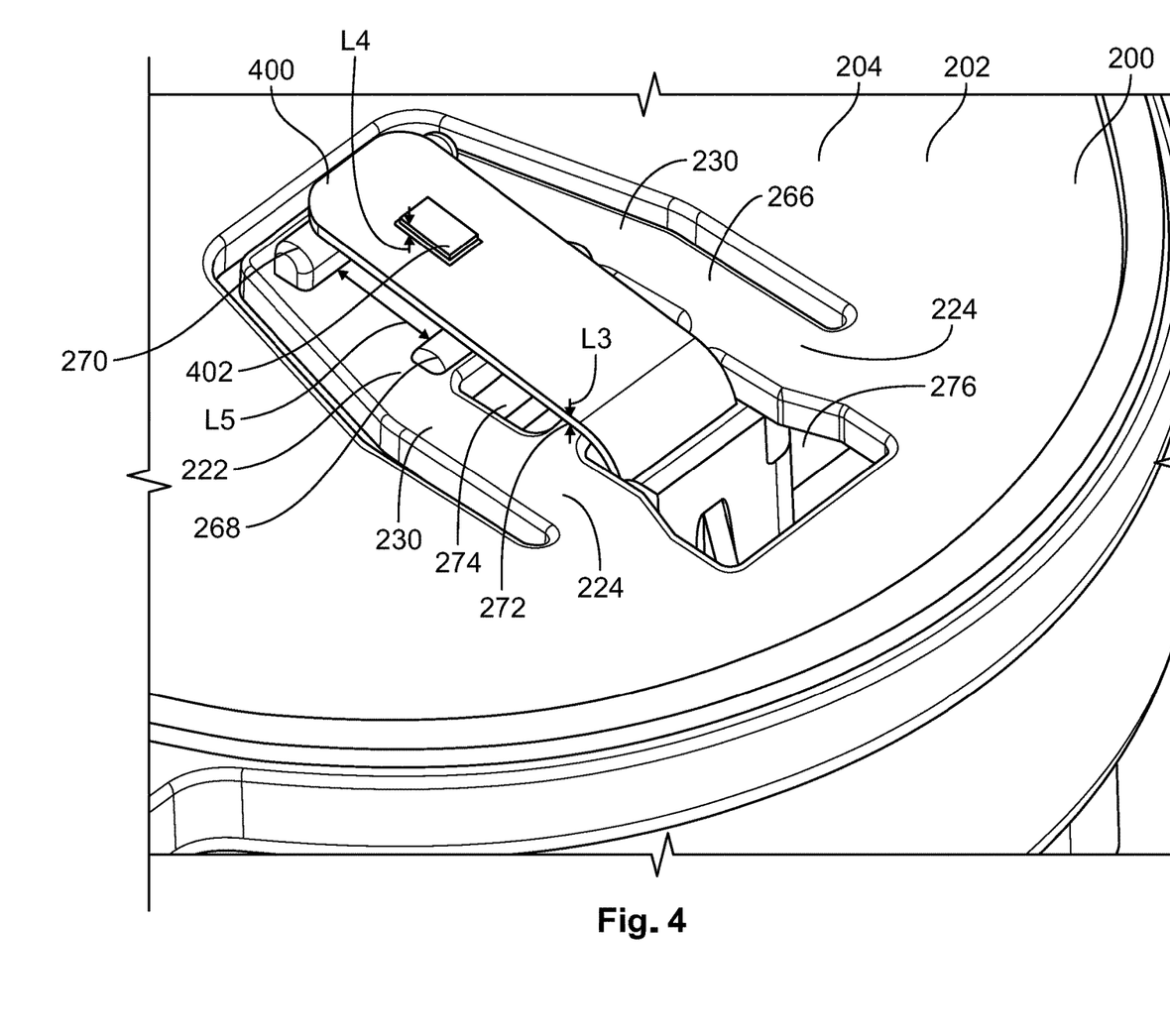
FIG. 4 is a detail perspective view of the sensing device of FIG. 3.

The FIG. 3 illustrates a sensing device 200 according to a second embodiment of the present invention. The sensing device 200 as illustrated in FIG. 3 is represented assembled but not attached to a windshield 20. The enlarged view of the FIG. 4 shows the area of the sensing device 200 facing the surface 22 of the windshield 20 when the sensing device 200 is attached to the windshield 20. As the FIG. 4 represents an enlarged view of the sensing device 200 and the FIG. 5 an exploded view of the sensing device 200, the FIGS. 3, 4 and 5 will be described together in the following. Elements with the same tens and ones in the reference numeral already described and illustrated in FIGS. 1 and 2 will not be described in detail again but reference is made to their description above.

Figure 5:
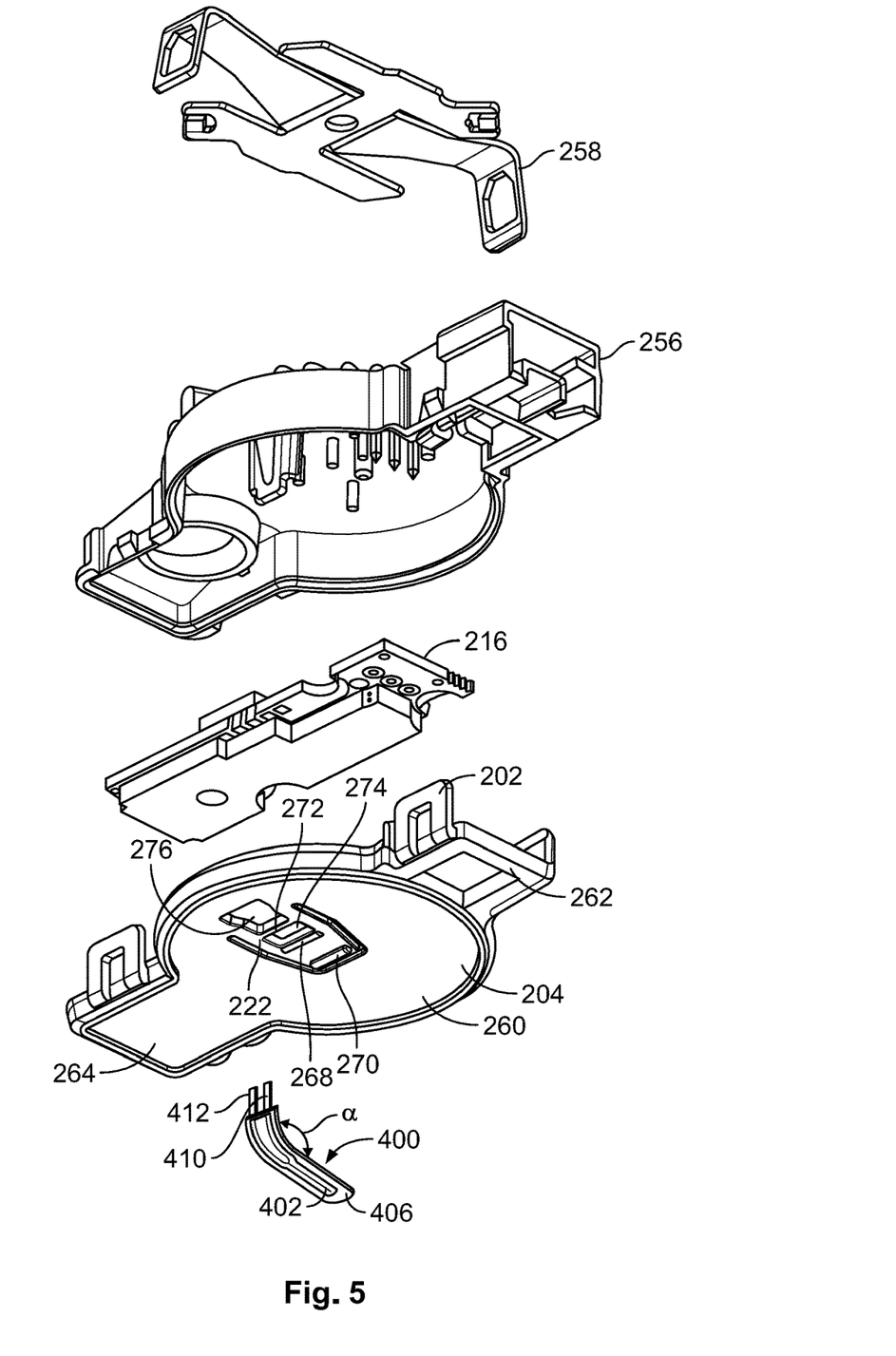
FIG. 5 is an exploded perspective view of the sensing device of FIG. 3.

As shown in FIG. 5, the sensing device 200 has an attachment member 202 which serves as a housing for a PCB 216. The attachment member 202 is closed by a housing 256, which is fixed on a retainer 258. The attachment member 202 according to the second embodiment has a central circular portion 260 from which extends two rectangular portions 262, 264 diametrically opposed.

As represented in the FIG. 4, the sensing element 400 has the transducer 402 embedded in the flexible film 406. In contrast with the first embodiment wherein the thickness L3 of the flexible film 406 is substantially equivalent to the thickness L4 of the transducer 402, in the second embodiment the thickness L4 of transducer 402 is greater than the thickness L3 of the rest of the flexible film 406.

The pressing device 222 of the sensing device 200 according to the second embodiment is U-shaped such that the extremities 224 of the U-shape are attached to the bottom surface 204 of the attachment member 202, as shown in FIG. 4. The rest of the U-shaped pressing device 222 is free, i.e. not being attached to the attachment member 202. In the second embodiment, the U-shaped pressing device 222 is formed integrally with the rest of the attachment member 202 in a plastic material such as to form a pressing device 222 acting as a spring arm which stay resilient and is stable over the years, in particular in comparison with foam elements as used in the prior art and illustrated in FIGS. 9a-b. In other embodiments, the pressing device 222 can be V-shaped, arc-shaped, or horseshoe-shaped.

In comparison with the pressing device 122 of the sensing device 100 according to the first embodiment, the external surface 266 of the central portion 226 of the U-shaped pressing device 222 is provided with two protrusions 268, 270. The protrusions 268, 270 are configured such that when the attachment member 222 is attached to the windshield surface 22, the protrusions 268, 270 extend from the surface 266 towards the windshield surface 22 and applies a pressure on or over the transducer 400, as illustrated in FIG. 4.

The protrusions 268, 270 have the shape of half cylinder attached to the surface 266 of the central portion 226 at the flat side of the half cylinder. The protrusions 268, 270 are integrally formed with the pressing device 222. The protrusions 268, 270 are positioned so that their axes are substantially perpendicular to the two members 230, connecting the central portion 226 to the extremities 224. Furthermore, the axes of the protrusions 268 and 270 are parallel and spaced from each other by a distance L5 so that the transducer 402 can be positioned between the protrusions 268, 270 as shown in FIGS. 3 and 4.

The protrusion 268 is positioned closer to the extremities 224 of the U-shaped pressing device 222 than the protrusion 270. Further, the protrusion 268 is smaller than the protrusion 270. Hence, the protrusion 270, having a height dimension taller than the one of the protrusion 268, allows pushing further the sensing element 400 towards the windshield surface 22. Therefore, the protrusions 268, 270 of the pressing device 222 according to the second embodiment, contribute to improve the quality of the contact between the windshield 20 and the transducer 402 thanks to the enhancement of the pressure applied over the transducer 402 of the flexible film 406.

Furthermore, in comparison with the sensing device 100 according to the first embodiment, the sensing device 200 has an elongate junction portion 272 connecting the two members 230 of the U-shaped pressing device 222, as shown in FIGS. 3-5. According to the second embodiment, the elongate junction portion 272 is formed integrally with the two members 230, the central portion 226, the protrusions 268, 270 and the attachment member 202. The elongate junction portion 272 is positioned perpendicularly to the two members 230 and substantially parallel to the length of the protrusions 268, 270 such as to form a first hole 274 and a second hole 276. The first hole 274 and the second hole 276 are a hollowed portion.

The portion of the sensing element 400 provided with the transducer 402 exits through the second hole 276. The elongate junction portion 272, separating the first hole 274—which is positioned adjacent to the central portion 226, from the second hole 276, allows guiding the sensing element 400. Indeed, the junction portion 272, the protrusion 268 and the protrusion 270 provide to the sensing element 400 a gradual slope between the second hole 276 and the greatest protrusion 270, which allows guiding and thus improving the quality of the contact between the windshield 20 (not represented) and the transducer 402.

Figure 6:
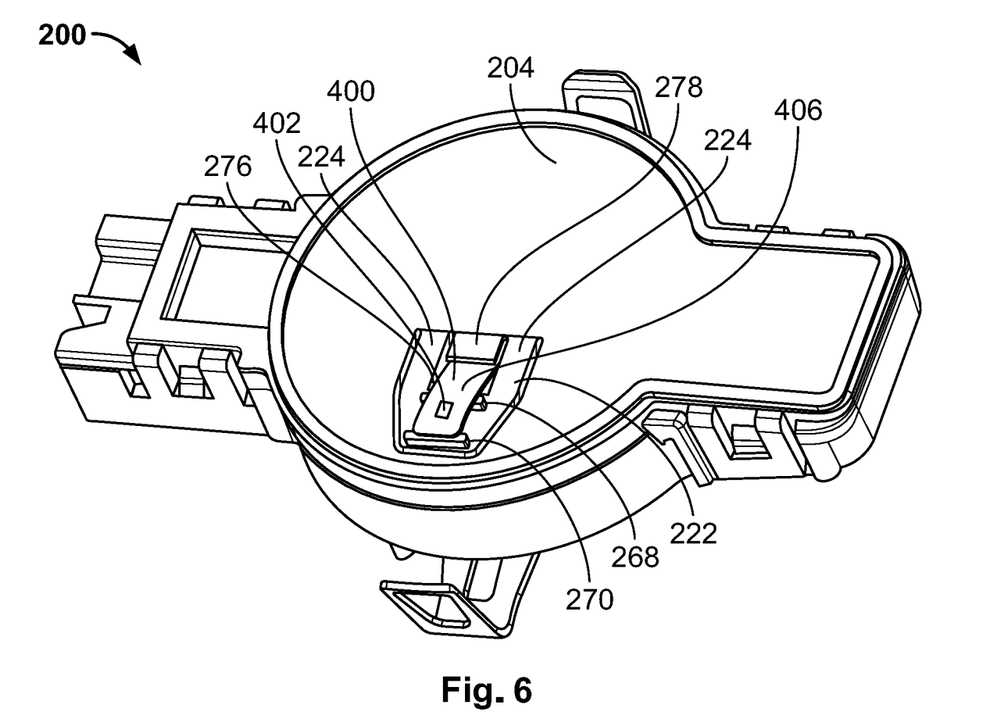
FIG. 6 is a perspective view of a sensing device according to a variant of the second embodiment.

FIG. 6 illustrates a variant of the sensing device 200 according to a second embodiment of the present invention. Elements with the same reference numeral already described and illustrated in FIGS. 3, 4 and 5 will not be described in detail again but reference is made to their description above. In the variant of the second embodiment illustrated in FIG. 6, the attachment member 222 of the sensing device 200 has a flattened tang 278 extending from the bottom surface 204 between the extremities 224 of the pressing device 222 towards the hole 276. Hence, the flattened tang 274 partially covers the hole 276. The flattened tang 278 provides further support to the sensing element 400 and help, in combination with the protrusions 268, 270, maintaining the part of the flexible film 406 comprising the transducer 402 closer to the surface 22 of the windshield 20 than the rest of the flexible film 406 of the sensing element 400. Indeed, holding the flexible film 406 under tension allows increasing the pressure applied on the transducer 402, and thus improves the contact with the windshield surface 22.

According to another variant, the attachment member 222 of sensing device 200 can be provided with the elongate junction portion 272 illustrated in FIGS. 3, 4 and 5 and the flattened tang 278 illustrated in FIG. 6.

Figure 7:
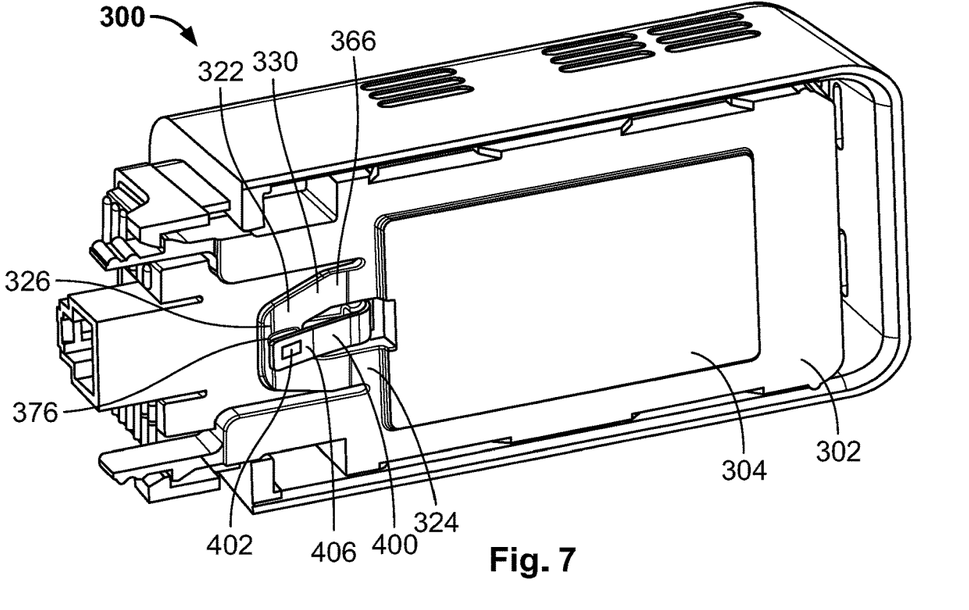
FIG. 7 is a sectional perspective view of a sensing device according to a third embodiment.
Figure 8:
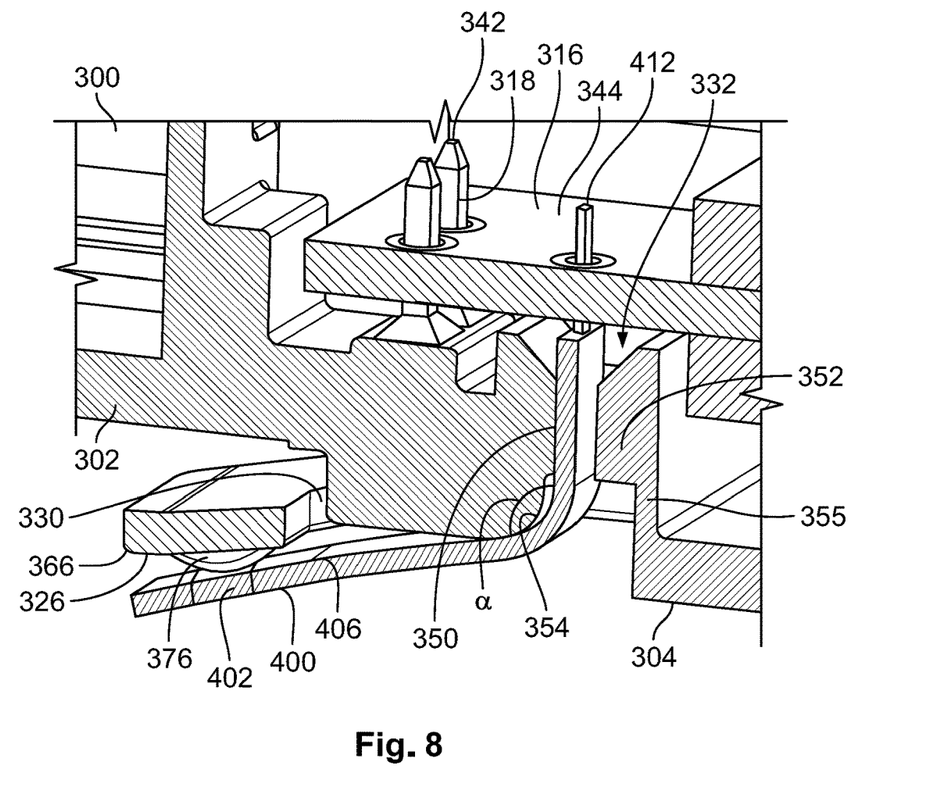
FIG. 8 is a detail sectional perspective view of the sensing device of FIG. 7.

FIG. 7 illustrates a sensing device 300 according to a third embodiment of the present invention. As FIG. 8 illustrates a cross-sectional view of the sensing device 300, FIG. 7 and FIG. 8 will be described together in the following. Elements with the same tens and ones in the reference numeral already described and illustrated in FIGS. 1, 2, 3, 4, 5 and 6 will not be described in detail again but reference is made to their description above.

As shown in FIGS. 7 and 8, in comparison with the attachment member 202 of the second embodiment, the attachment member 302 according to the third embodiment is substantially rectangular. The bottom surface 304 of the attachment member 302 has a pressing device 322 being U-shaped such that the extremities or free ends 324 of the U-shape are attached to the bottom surface 304. The rest of the U-shaped pressing device 322 is free, i.e. not being attached to the attachment member 302.

As in the second embodiment, the U-shaped pressing device 322 is formed integrally with the rest of the attachment member 302 in a plastic material such as to form a pressing device 322 acting as a spring arm which stay resilient and is stable over the years, in particular in comparison with foam elements as used in the prior art and illustrated in FIGS. 9a-b. In a variant, the extremities 324 of the arms 330 of the U-shaped pressing device 322 may be fixed to the attachment member 302 by bonding fixation or fastening elements, such as by a spring for example.

In comparison with the second embodiment, the external surface 366 of the central portion 326 of the U-shaped pressing device 322 is provided with one bump 376 as shown in FIGS. 7 and 8, instead of two protrusions 268, 270 in the second embodiment. The bump 376 extends out of the external surface 366 such that when the sensing device 300 is attached to a windshield 20, the bump 376 applies a pressure over the transducer 402 of the sensing element 400, hence improving the quality of the contact with the windshield surface 22.

As shown in FIG. 8, and as explained with respect to FIG. 1 according to the first embodiment, the attachment member 302 has a through-hole 332 adapted to receive the sensing element 400 such that the bare wire end 412 of the sensing element 400 extends out of the PCB 316, and can be soldered on the same surface 344 of the PCB 316 as the electrical contact pins 318 at their extremities 342. As for the first embodiment, the inner walls 334, 335 of the through-hole 332 are provided with protrusions 350, 352 helping guiding and maintaining the sensing element 400, especially under the conditions experienced by a sensing device attached to a motor vehicle windshield.

The sidewall 334 of the through-hole 332 terminates at the bottom surface 304 by a rounded portion 354 positioned so as to face the angle α of the sensing element 400. As illustrated in FIG. 8, the curve of the sensing element 400, having an angle α, follows the rounded portion 354. The bump 376 and the rounded portion 354 of the sensing device 300 allow maintaining the sensing element 400 under tension and thus allow increasing the pressure applies by the pressing device 322 over the transducer 402 of the sensing element 400.

Hence, according to all three embodiments described above, the pressing device 122, 222, 322 enhances the stability and the reliability of the contact between the sensing element 400 and the windshield 20 thanks to the resilience of the pressing device 122, 222, 322, which act as a spring arm being more stable over time than foam used in the prior art. Furthermore, because the transducer 402 is embedded in the flexible film 406, and thus protected, it becomes possible to apply a pressure over the transducer 402, in contrast with the device 1 of the prior art illustrated in FIGS. 9a-b. Hence, the quality of the contact between the sensing element 400 and the windshield 20 is further improved. The protrusions 268, 270 or the bump 376 also allows maintaining the transducer 400 closer to surface 22 of the windshield, and thus also permits enhancing the quality of the contact between the sensing element 400 and the windshield 20. This allows increasing the accuracy and the measurement's reliability, such as the measurement of the windshield's temperature.

Although the embodiments have been described in relation to particular examples, the invention is not limited and numerous alterations to the disclosed embodiments can be made without departing from the scope of this invention. The various embodiments and examples are thus not intended to be limited to the particular forms disclosed. Rather, they include modifications and alternatives falling within the scope of the claims and individual features can be freely combined with each other to obtain further embodiments or examples according to the invention.

What is claimed is:

1. A sensing device for a windshield, comprising:
   an attachment member attachable to a surface of the windshield, the attachment member having a pressing device that is integrally formed in a single piece with the attachment member, and is tab-shaped with a first portion of the pressing device attached to the attachment member and a second portion of the pressing device terminating in a free extremity; and
   a sensing element having a transducer, the pressing device applying a pressure on or over the transducer when the attachment member is attached to the surface and pressing the transducer against the surface.

2. The sensing device of claim 1, wherein the second portion is in contact with the transducer when the attachment member is attached to the surface.

3. The sensing device of claim 2, wherein the second portion is closer to the surface than the first portion in a direction normal to the surface when the attachment member is attached to the surface.

4. The sensing device of claim 2, wherein a surface of the second portion facing the windshield has a protrusion, the protrusion extends toward the surface and applies the pressure on or over the transducer.

5. The sensing device of claim 1, wherein the pressing device is pivotable at the first portion around an axis perpendicular to a length of the pressing device and can act as a spring arm applying the pressure on or over the transducer.

6. The sensing device of claim 1, wherein the pressing device has a hollowed portion and is U-shaped, V-shaped, arc-shaped or horseshoe-shaped.

7. The sensing device of claim 6, wherein a free end of the pressing device is fixed to the attachment member and a central section of the pressing device applies the pressure on or over the transducer.

8. The sensing device of claim 7, wherein the attachment member has a through-hole with an axis normal to the surface, the sensing element is positioned at least partially through the through-hole and at least partially through the hollowed portion.

9. The sensing device of claim 8, wherein the attachment member receives a printed circuit board and an electrical contact pin.

10. The sensing device of claim 9, wherein the printed circuit board has a through-hole with an axis merging with the axis of the through-hole of the attachment member.

11. The sensing device of claim 10, wherein the sensing element is positioned at least partially through the through-hole of the attachment member and through the through-hole of the printed circuit board, a bare wire end of the sensing element extends out of the printed circuit board when the sensing device is assembled.

12. The sensing device of claim 11, wherein a free extremity of the electrical contact pin and the bare wire end extend in a same direction from the through-hole of the printed circuit board.

13. The sensing device of claim 1, wherein the sensing element is one of a temperature sensor, a humidity sensor, an optical sensor, a pressure sensor, and a sound sensor, and includes the transducer embedded in a flexible film.

14. The sensing device of claim 1, wherein the sensing element is a Negative Temperature Coefficient thermistor embedded in a flexible polyimide film.

15. A method for attaching a sensing device on a windshield, comprising:

providing the sensing device including an attachment member having a pressing device that is tab-shaped, with a first portion of the pressing device attached to the attachment member and a second portion of the pressing device terminating in a free extremity, and a sensing element having a transducer;

attaching the attachment member to a surface of the windshield, the pressing device applying a pressure on or over the transducer pressing the transducer against the surface;

assembling an electrical contact pin to the attachment member;

accommodating a printed circuit board in the attachment member with a free extremity of the electrical contact pin extending out of a through-hole of the printed circuit board; and bending the sensing element to form an angle between a first portion of the sensing element and a second portion of the sensing element, the second portion having the transducer.

16. The method of claim 15, wherein the attachment member receives a printed circuit board and an electrical contact pin, the method including:

soldering a bare wire end of the sensing element to the printed circuit board; and soldering the electrical contact pin to the printed circuit board in a same step as the soldering of the bare wire end.

\* \* \* \* \*